US009304798B2

(12) United States Patent
Mudigonda et al.

(10) Patent No.: US 9,304,798 B2
(45) Date of Patent: Apr. 5, 2016

(54) SCALABLE MULTI-TENANT NETWORK ARCHITECTURE FOR VIRTUALIZED DATACENTERS

(75) Inventors: Jayaram Mudigonda, San Jose, CA (US); Praveen Yalagandula, San Francisco, CA (US); Jeffrey Clifford Mogul, Menlo Park, CA (US); Bryan Stiekes, Brownstown Township, MI (US); Anna Fischer, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 130 days.

(21) Appl. No.: 14/122,164

(22) PCT Filed: Jun. 7, 2011

(86) PCT No.: PCT/US2011/039512
§ 371 (c)(1),
(2), (4) Date: Nov. 25, 2013

(87) PCT Pub. No.: WO2012/170016
PCT Pub. Date: Dec. 13, 2012

(65) Prior Publication Data
US 2014/0115584 A1     Apr. 24, 2014

(51) Int. Cl.
*H04L 12/28*     (2006.01)
*G06F 9/455*     (2006.01)
(Continued)

(52) U.S. Cl.
CPC ........ *G06F 9/45533* (2013.01); *H04L 12/4633* (2013.01); *H04L 12/4641* (2013.01); *H04L 67/1095* (2013.01); *H04L 67/38* (2013.01); *H04L 61/103* (2013.01)

(58) Field of Classification Search
None
See application file for complete search history.

(56) References Cited

U.S. PATENT DOCUMENTS

| 2005/0044301 A1 | 2/2005 | Vasilevsky et al. |
| 2005/0120160 A1 | 6/2005 | Plouffe et al. |

(Continued)

FOREIGN PATENT DOCUMENTS

| CN | 102196918 | 9/2011 |
| JP | 2002361902 | 12/2002 |
| JP | 2007160562 | 6/2007 |

OTHER PUBLICATIONS

PCT Search Report/Written Opinion—Application No. PCT/US2011/039512 dated Feb. 9, 2012—9 pages.

(Continued)

*Primary Examiner* — Kouroush Mohebbi
(74) *Attorney, Agent, or Firm* — Hewlett Packard Enterprise Patent Department

(57) ABSTRACT

A scalable, multi-tenant network architecture for a virtualized datacenter is provided. The network architecture includes a network having a plurality of servers connected to a plurality of switches. The plurality of servers hosts a plurality of virtual interfaces for a plurality of tenants. A configuration repository is connected to the network and each server in the plurality of servers has a network agent hosted therein. The network agent encapsulates packets for transmission across the network from a source virtual interface to a destination virtual interface in the plurality of virtual interfaces for a tenant in the plurality of tenants. The packets are encapsulated with information identifying and locating the destination virtual interface, and the information is interpreted by switches connected to the source virtual interface and the destination virtual interface.

17 Claims, 12 Drawing Sheets

(51) Int. Cl.
*H04L 12/46* (2006.01)
*H04L 29/08* (2006.01)
*H04L 29/06* (2006.01)
*H04L 29/12* (2006.01)

(56) References Cited

U.S. PATENT DOCUMENTS

| | | | |
|---|---|---|---|
| 2010/0257263 A1 | 10/2010 | Casado et al. | |
| 2010/0268764 A1 | 10/2010 | Wee et al. | |
| 2011/0022812 A1* | 1/2011 | van der Linden et al. | 711/163 |
| 2011/0075664 A1 | 3/2011 | Lambeth et al. | |
| 2011/0075674 A1 | 3/2011 | Li et al. | |
| 2011/0126197 A1 | 5/2011 | Larsen et al. | |
| 2012/0059930 A1* | 3/2012 | Devarakonda et al. | 709/224 |

OTHER PUBLICATIONS

Al-Fares et al., A Scalable, Commodity Data Center Network Architecture, SIGCOMM '08, Aug. 2008 (12 pages).
BROADCOM, White Paper, Broadcom Ethernet Network Controller Enhanced Virtualization Functionality, Oct. 2009 (10 pages).
CISCO, Designing Secure Multi-Tenancy into Virtualized Data Centers, Internet Citation, XP-00271374, Mar. 16, 2010 (82 pages).
Edwards et al., Diverter: A New Approach to Networking Within Virtualized Infrastructures, Aug. 2009 (8 pages).
European Patent Office, Extended European Search Report for EP 11867520.6 dated Nov. 5, 2014 (7 pages).
Greenberg et al., VL2: A Scalable and Flexible Data Center Network, Aug. 2009 (12 pages).
Guo et al., SecondNet: A Data Center Network Virtualization Architecture with Bandwidth Guarantees, Nov. 2010 (14 pages).
Heller et al., ElasticTree: Saving Energy in Data Center Networks dated Apr. 2010 (16 pages).
Kim et al., Floodless in Seattle: A Scalable Ethernet Architecture for Large Enterprises, 2008 (14 pages).
Li et al., Scalable and Cost-effective Interconnection of Data-center Servers Using Dual Server Ports, IEEE/ACM Transactions on Networking, vol. 19, No. 1, Feb. 2011 (13 pages).
Mudigonda et al., NetLord: A Scalable Multi-Tenant Network Architecture for Virtualized Datacenters, Aug. 2011 (12 pages).
Mudigonda et al., Spain: COTS Data-Center Ethernet for Multipathing over Arbitrary Topologies, Apr. 2010 (16 pages).
Mysore et al., PortLand: A Scalable Fault-Tolerant Layer 2 Data Center Network Fabric, SIGCOMM '09, Aug. 2009 (12 pages).
Scott et al., Addressing the Scalability of Ethernet with MOOSE, 2009 (8 pages).
Sherwood et al., Can the Production Network Be the Testbed? Oct. 2010 (14 pages).
Shieh et al., Seawall: Performance Isolation for Cloud Datacenter Networks, Jun. 2010 (7 pages).
The International Bureau of WIPO, International Preliminary Report on Patentability for PCT/US2011/039512 dated Dec. 27, 2013 (6 pages).
Unnikrishnan et al., Scalable Network Virtualization Using FPGAs, University of Massachusetts and UBS—Lab STICC Lorient, France, Feb. 21, 2010 (10 pages).
Wikipedia, IEEE 802.1Q, Feb. 2010 (3 pages).
Willmann et al., Concurrent Direct Network Access for Virtual Machine Monitors, 2007 (12 pages).

* cited by examiner

600

| Tenant ID, IP address$_{VIF}$ | MAC$_{VIF}$ |
|---|---|
| 12.10, 10.1.12.10 | 00-A0-C9-15-E4-31 |
| 12.20, 10.2.12.20 | 00-A0-C9-15-E4-31 |
| 12.20, 10.3.12.20 | 00-A0-C9-15-E4-31 |
| 12.30, 10.4.12.30 | 00-A0-C9-15-E4-31 |

610      615

605

| Tenant ID, MAC_AS_ID$_{VIF}$, MAC$_{VIF}$ | MAC$_{switch}$, port number |
|---|---|
| 12.10, 1, 00-27-13-FF-47-C1 | 00-A0-C9-15-E4-31, 1 |
| 12.20, 1, 10-B0-D1-32-CD-F4 | 00-A0-C9-15-E4-31, 2 |
| 12.20, 1, 45-B4-C3-25-EF-56 | 00-A0-C9-15-E4-31, 3 |
| 12.30, 1, 13-27-A9-E7-83-FF | 00-A0-C9-15-E4-31, 4 |
| 12.40, 2, D3-A9-15-87-C8-D9 | 13-D5-16-B7-94-A8, 5 |

SCALABLE MULTI-TENANT NETWORK ARCHITECTURE FOR VIRTUALIZED DATACENTERS

CROSS-REFERENCE TO RELATED APPLICATION

This application is a national stage application under 35 U.S.C. §371 of PCT/US2011/039512, filed Jun. 7, 2011.

BACKGROUND

Cloud datacenters are becoming increasingly popular, as they offer computing resources for multiple tenants at a very low cost on an attractive pay-as-you-go model. Many small and medium businesses are turning to these cloud datacenters, not only for occasional large computational tasks, but also for their IT jobs. This helps them eliminate the expensive, and often very complex, task of building and maintaining their own infrastructure. The operators of these multi-tenant cloud datacenters can provide a cost-effective Infrastructure as a Service ("IaaS"), because they can time-multiplex the physical infrastructure among a large number of tenants. The advent of mature CPU virtualization techniques makes it possible to convert dedicated, and often underutilized, physical servers into Virtual Machines ("VMs") that run in an IaaS provider's cloud datacenter.

To fully realize the benefits of resource sharing, these cloud datacenters must scale to huge sizes. The larger the number of tenants, and the larger the number of VMs, the better the chances for multiplexing, which in turn achieves better resource efficiency and cost savings. Increasing the scale alone, however, cannot fully minimize the total cost as a great deal of expensive human effort is required to configure the equipment, to operate it optimally, and to provide ongoing management and maintenance. A good fraction of these costs reflect the complexity of managing a multi-tenant network, which must scale to large numbers of tenants, hosts and VMs, support large numbers of addresses, and provide ample bandwidth between the VMs of any tenant. Most currently available network architectures are not capable to support multi-tenancy in an efficient and scalable fashion and usually compromise low cost or ease of operation.

BRIEF DESCRIPTION OF THE DRAWINGS

The present application may be more fully appreciated in connection with the following detailed description taken in conjunction with the accompanying drawings, in which like reference characters refer to like parts throughout, and in which:

FIG. 6 is a schematic diagram of example network address resolution tables stored by the network address resolution modules in the network agents across the network;

DETAILED DESCRIPTION

A scalable multi-tenant network architecture for virtualized datacenters is disclosed. A virtualized datacenter, as generally described herein, is a collection of computing resources that can host multiple applications and services for the storage, management, and dissemination of data and information. The computing resources may include both physical and virtual resources (e.g., virtual machines) in multiple servers, and be shared by multiple organizations or tenants. The tenants may have different data usage requirements and network needs, and access the virtualized datacenter on demand. The datacenter may offer its resources and infrastructure as a service ("IaaS", such as a part of a cloud computing model) to the tenants, and bill them for their use.

In various embodiments, the scalable, multi-tenant network architecture enables a virtualized datacenter to be scalable at a low cost and offer its tenants a flexible and secure network that is easy to operate and configure. The network architecture exploits inexpensive commodity equipment to scale the datacenter to at least tens of thousands of tenants, tens of thousands of servers, and millions of virtual machines ("VMs"). Tenants have the flexibility to design and use their network as if they are its only occupant.

As described in more detail herein below, the network architecture provides tenants a simple and flexible network abstraction by fully and efficiently virtualizing the address space at both L2 (i.e., data link) and L3 (i.e., network) layers, without any restrictions on the tenants' choice of L2 or L3 addresses. This flexibility allows tenants to create networks that span VMs both in their own virtualized datacenters and in rented cloud datacenters. Tenants may move VMs or entire applications from their own datacenter to the cloud datacenter, without needing to change the network addresses used to identify the VMs.

It is appreciated that, in the following description, numerous specific details are set forth to provide a thorough understanding of the embodiments. However, it is appreciated that the embodiments may be practiced without limitation to these specific details. In other instances, well known methods and structures may not be described in detail to avoid unnecessarily obscuring the description of the embodiments. Also, the embodiments may be used in combination with each other.

Figure 1:
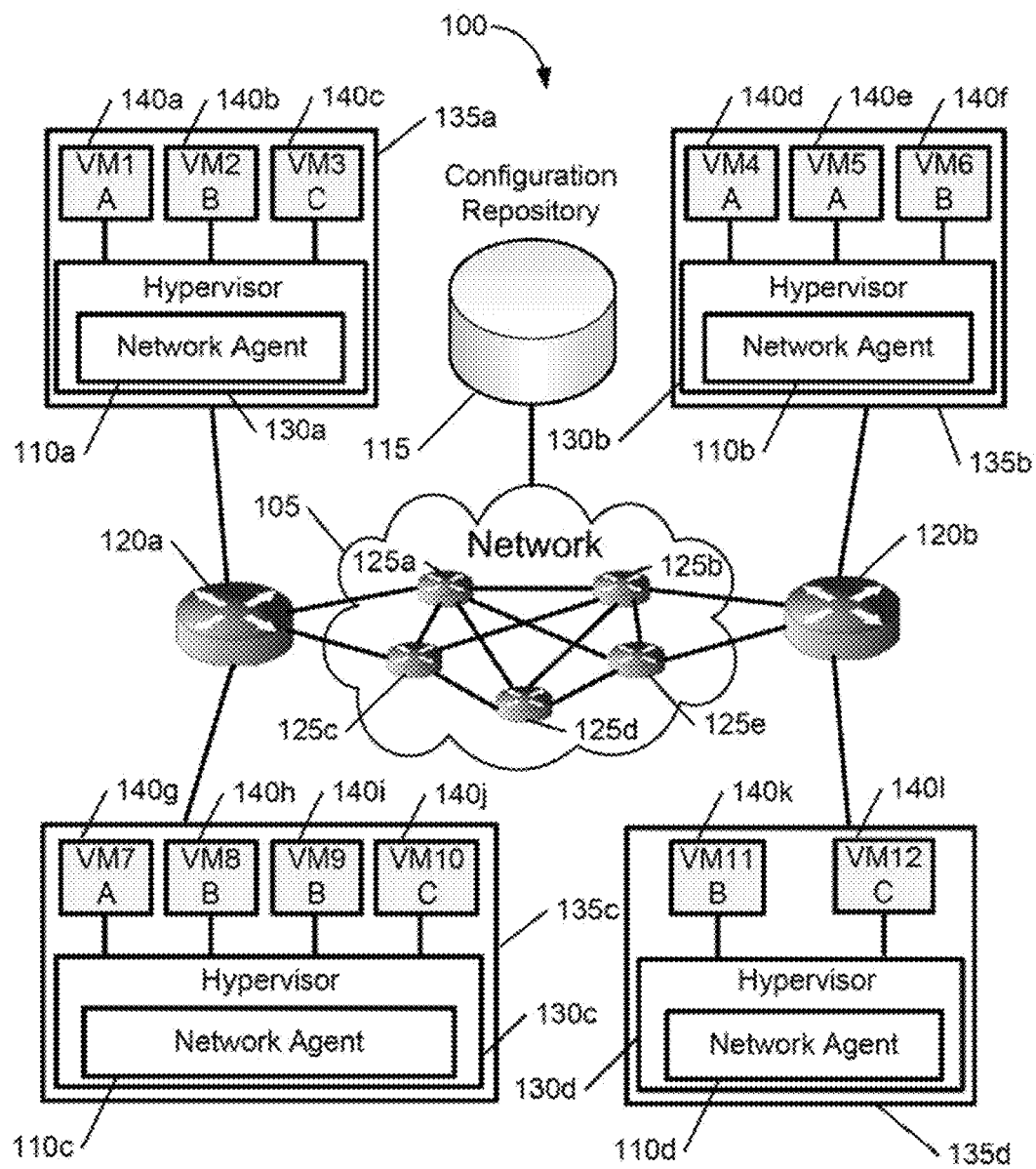
FIG. 1 illustrates an example of a scalable, multi-tenant network architecture on which the embodiments may be implemented.

Referring now to FIG. 1, an example of a scalable, multi-tenant network architecture on which the embodiments may be implemented is illustrated. Network architecture 100 is composed of three main components: (1) a network 105; (2) a set of network agents ("NAs") 110*a-d*; and (3) a configuration repository 115. Network 105 may be a switched Ethernet network based on off-the-shelf commodity components, such as, for example, edge switches 120*a-b* and switches 125*a-e*. In various embodiments, edge switches 120*a-b* and switches 125*a-e* support virtual local area networks ("VLANs") and basic IP forwarding among their ports. The network 105 may have any topology, such as, for example, a Fat Tree. Clique, or HyperX topology, among others.

As described in more detail herein below, the network architecture 100 does not require full-fledged IP routing support, with all of its sophisticated routing protocols and their complex configuration requirements. The edge switches 120*a-b* and the switches 125*a-e* need only be able to forward packets sent to their own MAC addresses, based on the header found inside the packets. In various embodiments, the edge switches 120*a-b* perform the basic longest prefix match ("LPM") of the destination IP address over a small number of static routing table entries.

The network agents 110*a-d* reside in the hypervisors (or the driver domain) 130*a-d* of servers 135*a-d* connected to the network 105. Each server 135*a-d* may run one or multiple VMs for one or multiple tenants. Each VM can have one or more virtual interfaces ("VIFs"), which are abstract virtualized representations of a computer network interface that may or may not correspond directly to a physical network interface. The network agent ("NA") in each server manages the networking of all the VIFs in the VMs in the server. For example, the server 135*a* with hypervisor 130*a* and NA 110*a* may run VM1 140*a* for a tenant "A", VM2 140*b* for a tenant "B", and VM3 140*c* for a tenant "C"; the server 135*b* with hypervisor 130*b* and NA 110*b* may run VM4 140*d* and VM5 140*e* for the tenant "A", and VM6 140*f* for the tenant "B"; the server 135*c* with hypervisor 130*c* and NA 11I may run VM7 140*g* for the tenant "A", VM8 140*h* and VM9 140*i* for the tenant "B", and VM10 140*j* for the tenant "C"; and the server 135*d* with hypervisor 130*d* and NA 110*d* may run VM11 140*k* for the tenant "B" and VM12 140*l* for the tenant "C".

It is appreciated that each server 135*a-d* may run VMs from multiple tenants, and that each tenant may have their VMs at any server. It is also appreciated that servers 135*a-d*, VMs 140*a-l*, and tenants "A", "B", and "C" are shown for illustrative purposes only. Additional servers, VMs, and tenants may utilize network architecture 100, and in fact, the network architecture 100 is able to support tens of thousands of servers, tens of thousands of tenants, and millions of VMs.

The configuration repository 115 is a central repository for the network architecture 100 and resides at a well-known address. The central repository 115 holds a VLAN table that lists for each edge-switch pair (e.g., edge switches 120*a-b*), the set of VLANs that connect the two switches. This set of VLANs can be determined by any network multipathing solution for commodity switches with VLAN support. In various embodiments, the central repository 115 may be co-located with a VM manager system (not shown) for managing VMs (e.g., VMs 140*a-l*) in a virtualized datacenter.

Each tenant in the network architecture 100 (e.g., tenants "A", "B", and "C") has its own private IP and MAC address spaces to facilitate tenant isolation in the network as well as to enable L2 and L3 virtualizatioan. In various embodiments, the entire private IP address of a tenant forms a single MAC address space. Each tenant can specify multiple IP subnets, each supported by one of several MAC address spaces. For each IP subnet, a tenant can also specify the IP address of a virtual IP router.

Each tenant can administer its private address spaces as it pleases, because these L2 and L3 address spaces are fully virtualized. Multiple tenants can use the same address without having their packets misrouted. As described in more detail herein below, this address assignment satisfies the same standard uniqueness requirements as in traditional networks: no two interfaces of a given tenant can be identified with the same address and no two interfaces within the same IP subnet can have the same MAC address. Further, a tenant may choose to not assign any IP address at all for an interface.

Apart from these per-tenant private address spaces, a public address space that is shared across all tenants and is also exposed beyond the datacenter is provided. A tenant can designate a VM interface (i.e., a VIF), at configuration time, as having a public IP address. These addresses can be assigned either statically or dynamically. These interfaces are visible to the external world, and are the virtual equivalents of WAN interfaces in real datacenters.

Figure 2:
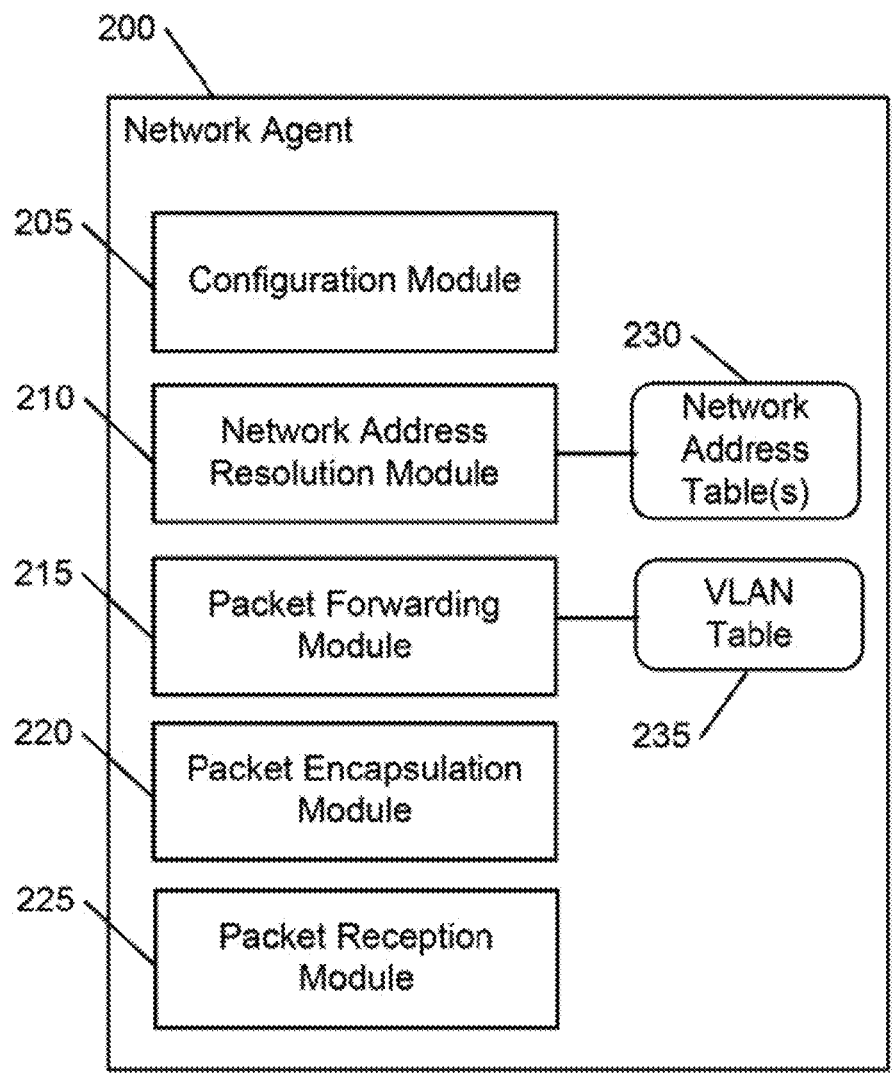
FIG. 2 is an example schematic diagram of a network agent for use with the network architecture of FIG. 1.

Attention is now directed to FIG. 2, which illustrates a network agent of FIG. 1 in more detail. In various embodiments, the network agent 200 may include a configuration module 205, a network address resolution module 210, a packet forwarding module 215, a packet encapsulation module 220, and a packet reception module 225. The configuration module 205 sets up the network agent 200 and the VIFs managed by the network agent 200 for operation in the network architecture 100. The network address resolution module 210 collaborates with other network agents in the network architecture 100 to gather and maintain all information necessary for forwarding and receiving packets in the network. The information is stored in one or more network address resolution tables 230.

The packet forwarding module 215 handles the forwarding of packets from the VIFs managed by the network agent 200 to other VIFs in the network. The packet forwarding module 215 works jointly with the network address resolution module 210 and the packet encapsulation module 220, which encapsulates the packets to be transmitted across the network. The packet forwarding module 215 also assigns a VLAN tag to the packets to be transmitted across the network based on a VLAN table 235 that is downloaded at configuration time from the configuration repository 115. The packet reception module 225 is responsible for handling the reception of packets from other VIFs in the network. It is appreciated that packets in the network may be transmitted between VMs of a given tenant in its private IP and MAC address spaces, and between VMs belonging to different tenants via public VIFs in the network. The operation of these modules is discussed in more detail herein below.

The network agent 200 has an autonomous. "plug-and-play" configuration of special IP addresses at boot time. This plug-and-play configuration is possible because all the edge switches (e.g., edge switches 120*a-b*) in the network architecture 100 have a simple, static configuration that never changes during their operation. All edge switches are configured to specify the IP addresses that appear on each of their down-link ports. Because these IP addresses are local to the ports of a given switch, all edge switches use the same configuration.

The special IP addressing scheme used by the network agent 200 may include, for example, prefixes of the form 10.p.0.0/16, p.0.0.0/24, or any other addressing scheme that uses the port number p as part of the IP address and leaves a set number of bits (e.g., 16 in the 10.p.0.0/16 addressing scheme and 24 in the p.0.0.0/24 addressing scheme) to identify a tenant, as described in more detail herein below. It is appreciated that the IP addressing scheme 10.p.0.0/16 is used herein below as an example for descriptive purposes only. As appreciated by one skilled in the art, any other IP addressing scheme based on the port number p and a tenant ID may be used.

Each edge switch keeps a routing table to store these IP addresses. An edge switch inserts one routing table entry for each one of its down-link ports. These entries are fixed and do not change during the switch's operation. For a given port p, the routing table entry stores a prefix such as, for example, 10.p.0.0/16 and the next-hop address of 10.p.0.1, or p.0.0.0/24 and the next-hop address of p.0.0.1, among others. As a result, the number of routing table entries is small (equal to the number of down-link ports), even for the most inexpensive switch. The lower order bits of the individual IP address within each prefix identifies a tenant in the server connected to the port p. For example, the IP address 10.p.12.25 appears as the destination address in all packets bound to VMs on the server connected to port p, and belonging to a tenant identified with the ID 12.25. It is appreciated that servers are identified with IP addresses of the form 10.p.0.1 in the case of a 10.p.0.0/16 addressing scheme, or p.0.0.1 in the case of a p.0.0.0/24 addressing scheme.

Figure 3:
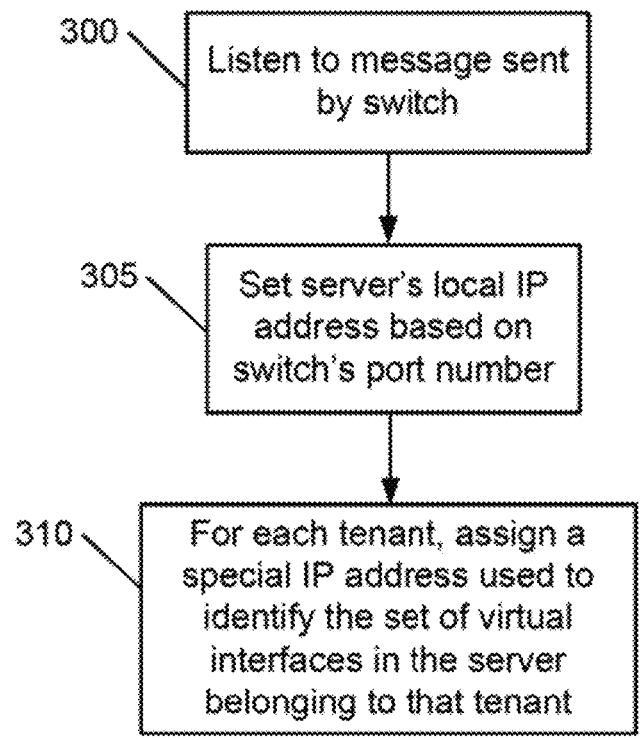
FIG. 3 is a flowchart for configuring a network agent of FIG. 2 in accordance with various embodiments.

Referring now to FIG. 3, a flowchart for configuring a network agent of FIG. 2 in accordance with various embodiments is described. First, whenever a hypervisor having a network agent boots, the network agent 200 listens to Link Layer Discovery Protocol ("LLDP", or IEEE 802.1AB standard) messages by the edge switch to which it is connected (300). The LLDP messages contain the switch's port number p and MAC address. The network agent then sets its servers' local IP address based on the switch's port number p as, for example, 10.p.0.1 (305) and associates a special IP address of the form 10.p.<tenant ID> with each tenant's set of VMs present in the server when sending packets across the network (310). Note that every server in the network has a local IP address of the form 10.p.0.1, regardless of the switch it is connected to. Two servers connected to different switches may have the same local IP address if they both use the same port number p. After setting up its server's and tenants' IP addresses, the network agent is then ready to respond to any Address Resolution Protocol ("ARP") queries for its local address from the local edge switch to which the server is connected.

It is appreciated that the local IP address (e.g., 10.p.0.1) associated with the server is local to the edge switch to which the server is connected. That is, this local IP address is not used beyond the edge switch to address packets across the network. It is also appreciated that the special IP addresses associated with a tenant's set of VMs present in the server and used by the network agents in the network to address packets across the network are known only by the network agents in the network. The VMs themselves have no knowledge of these special IP addresses. As described in more detail herein below, these special IP addresses are used to encapsulate packets across the network and facilitate communication between two network agents, i.e., a source network agent and a destination network agent.

Figure 4:
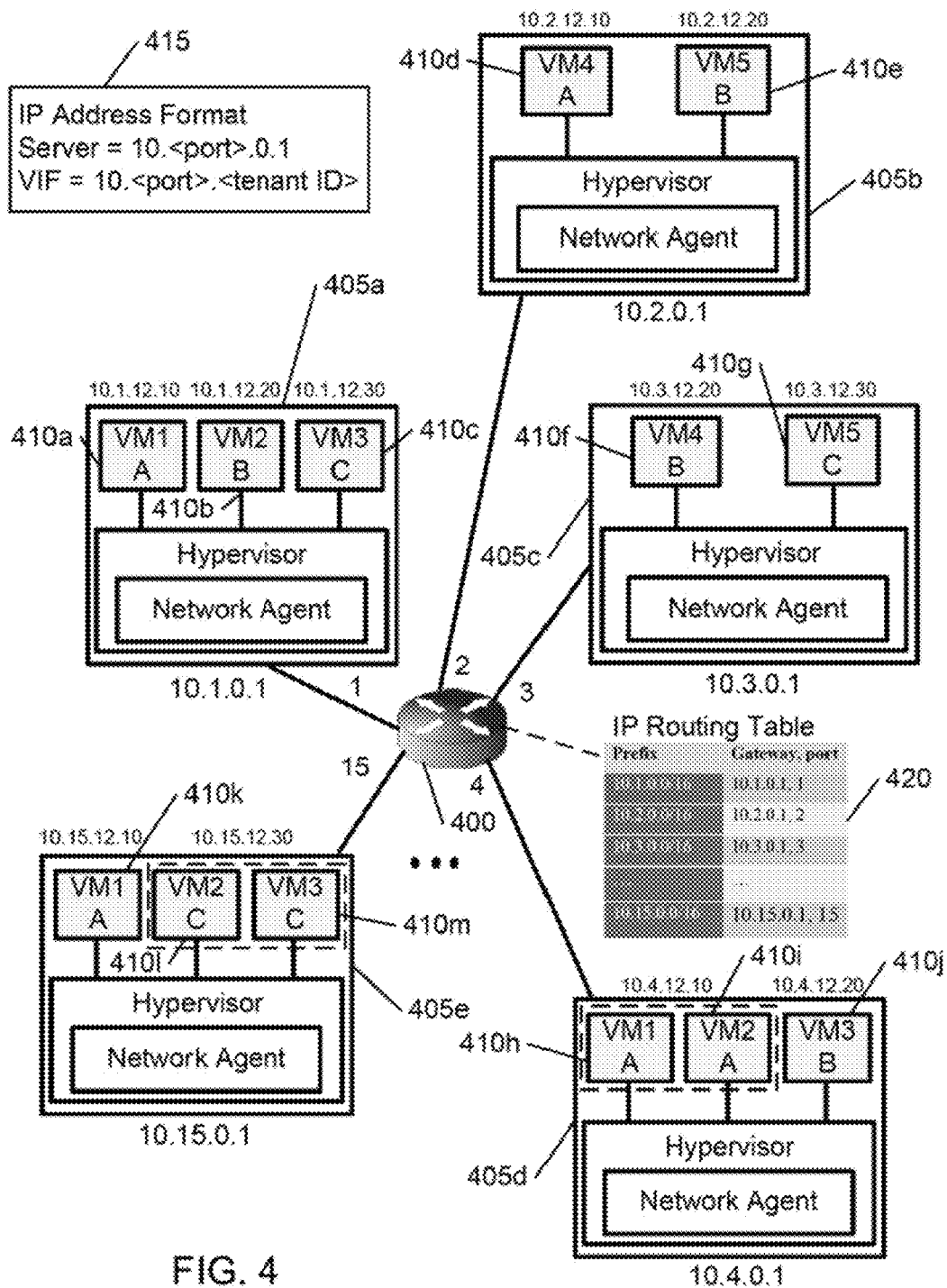
FIG. 4 is a schematic diagram illustrating an example configuration of an edge switch and network agents connected thereto.

A schematic diagram illustrating an example configuration of an edge switch and network agents connected thereto is shown in FIG. 4. Edge switch 400 has 15 ports and a server connected to each one of its ports. Edge switch 400 also stores a routing table 420 with information for each one of its ports. The servers are connected to the switch 400 and have VMs with VIFs that are connected internally to network agents. The network agents (as described above with reference to FIG. 3) configure local IP addresses for the servers and special IP addresses for their VIFs as they are placed into the network. Each server connected to the switch 400 has a local IP address of the form 10.p.0.1, where p designates the port in the switch 400 to which the server is connected. For example, the server 405a connected to port 1 of the switch 400 has the local IP address 10.1.0.1, the server 405b connected to port 2 of the switch 400 has the local IP address 10.2.0.1, the server 405c connected to port 3 of the switch 400 has the local IP address 10.3.0.1, and the server 405d connected to port 15 of the switch 400 has the local IP address 10.15.0.1.

The special IP address format 415 is used for the IP addresses for the servers 405a-d and to guide packets to the VIFs in the VMs 410a-m. The special IP addresses depend on the switch's port number to which the server is connected and the tenant to which they belong. Each set of virtual machines on a single server belonging to a single tenant is collectively associated with a special IP address of the form 10.p.<.tenant ID>. For example, VIF 410a in server 405a is reached via the special IP address 10.1.12.10 as the server 405a is connected to port 1 of the switch 400 and the VIF belongs to tenant "A" with ID 12.10. VIFs 410d and 410k also belonging to tenant "A" are reached the special IP addresses 10.2.12.10 and 10.15.12.10 as they are in servers 405b and 405d respectively connected to ports 2 and 15 of the switch 400. And VIFs 410h and 410i are accessed by the same special IP address 10.3.12.10 as they both reside in server 405-e 405d for tenant "A". Note that being accessed by the same special IP address does not prevent the VIFs 410h-410i from being identified and addressed correctly, as each VIF in the network is identified by a unique ID described in more detail herein below.

Similarly, tenant "B" has VIF 410b in server 405a connected to port 1 of the switch 400, VIF 410e in server 405b connected to port 2 of the switch 400, VIF 410f in server 405c connected to port 3 of the switch 400, and VIF 410j in server 405d connected to port 4 of the switch 400. The VIFs 410b, 410e, 410f, and 410j are respectively reached via the special IP addresses 10.1.12.20, 10.2.12.20, 10.3.12.20, and 10.4.12.20 for tenant "B" with ID 12.20. Tenant "C" has VIF 410b in server 405a connected to port 1 of the switch 400, VIPF 410g in server 405c connected to port 3 of the switch 400, and VIFs 410l-m connected to port 15 of the switch 400. The VIFs 410b, 410g, and 410l-m are respectively reached via the special IP addresses 10.1.12.30, 10.3.12.30, and 10.15.12.30 for tenant "C" with ID 12.30. Note that VIFs 410l-m may be reached by the same IP address, but they are identified with unique IDs that enable them to be addressable by the network.

In various embodiments, each VIF in the network is uniquely identified by a three-tuple of the form: <Tenant_ID>, MAC_AS_ID, MAC>. The Tenant_ID field (e.g., 16 bits) identifies the ID of the tenant to which the VIF belongs, the MAC_AS_ID field identifies the MAC address space to which the VIF is connected, and the MAC field identifies the VIF by its unique MAC address within the MAC address space indicated by MAC_AS_ID. It is appreciated that the MAC_AS_ID may be the same as the IP subnet number used by the tenant. As described herein below, this unique ID enables the network agent 200 to properly address encapsulated packets across the network.

Figure 5A:
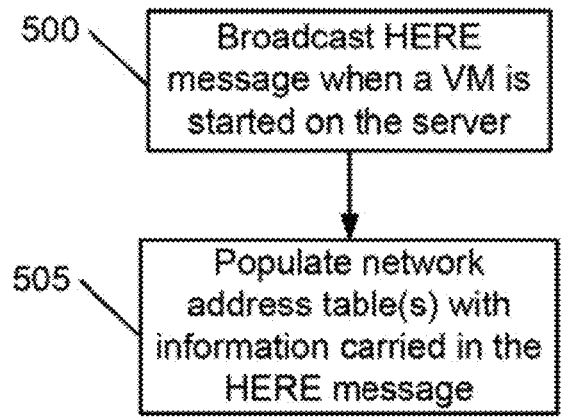
FIGS. 5A-C are flowcharts for a network address resolution module of FIG. 2 in accordance with various embodiments.
Figure 5B:
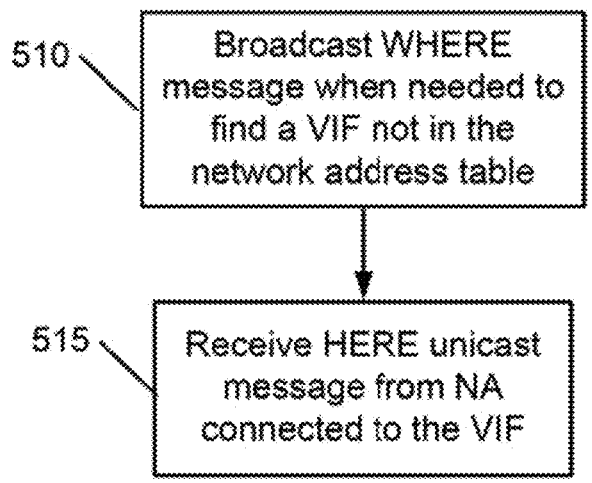
Figure 5C:
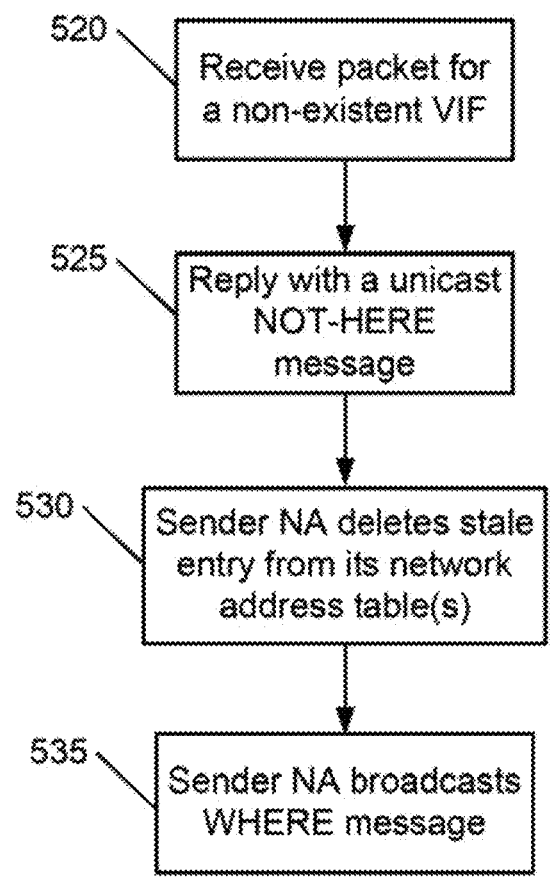

Referring now to FIGS. 5A-C, flowcharts for a network address resolution module in accordance with various embodiments are described. The primary purpose of the network address resolution module 210 is to maintain network address resolution table(s) ("NARTs") 230 that map a VIF's unique ID (as described below) to its location in the network, specified by the MAC address and the port number of the switch to which the VIF's host server is connected. That is, the network address resolution module 210 replaces the traditional ARP and uses the NARTs 230 to serve as a proxy for the traditional ARP requests from the local VMs.

In various embodiments, the network address resolution module, in contrast to traditional ARP mechanisms, is based on a "by-default-push" model where a binding of a VIF to its location is pushed to all network agents in the network whenever it changes. As appreciated by those of skill in the art, traditional ARP mechanisms pull the bindings only when they are needed. This by-default-push model facilitates the network design and allows for manageable overheads.

The network address resolution module 210 implements this model with three message types, all using the same packet format and an opcode field to specify the message type: (1) a query WHERE message; (2) a positive location information HERE message; and (3) a negative location information NOT-HERE message. When broadcast at the L2 layer, these messages carry the ingress edge switch MAC as the source address and use a special VLAN that includes all server down-links on all edge switches. When unicast, these messages are IP addressed to the receiving network agent (with edge switch MAC addresses) and take a regular path through the network.

FIG. 5A illustrates the actions performed by the network address resolution module when a new VM is first started on its host server (e.g., the server running the network agent 200 with the network address resolution module 210). When a new VM is started, such as when the VM is first booted or has migrated to its host server from another server, the network address resolution module 210 in the network agent 200 in the VM's host server broadcasts a HERE message to all the network agents in the network (500). This HERE message carries the unique ID (as described herein below) and the location of the VIF in the new VM, i.e., the MAC address and port number of the switch to which the new VIF is connected. The information in the message is then used by all network agents in the network to populate their NARTs 230 (505), as described in more detail herein below with reference to FIG. 6.

It is appreciated that entries in the NARTs 230 are never deleted or expired. During normal operation, entries are kept current by the stream of HERE broadcasts sent by the network address resolution modules in the network agents across the network. Occasionally, it is possible that the NARTs 230 have reached their capacity (a very rare event) or that a packet from a network address resolution module 210 is dropped. In the first case, illustrated in FIG. 5B, a network agent 200 could have no space in its NARTs 230 to store the information of a given VIF in the network. When a lookup for the given VIF fails in its NARTs 230, the network address resolution module 210 in the network agent 200 broadcasts a WHERE message to all the network agents in the network (510). The network address resolution module 210 in the network agent 200 connected to the VIF then responds with a unicast HERE message (515).

In the second case, illustrated in FIG. 5C, stale entries in the NARTs 230 that are indicative of a previously dropped packet can result in a network agent 200 receiving a unicast packet for a non-existent VIF (520). This could be the case, for example, when the VIF has changed its location but the change was communicated in a packet that was ultimately dropped. Because the packet was dropped, the change was not communicated to other network agents and their NARTs 230 were not updated to reflect the change. A network agent could send a packet to the old VIF's location, but because the VIF is no longer at that location, the receiving network agent does not recognize the VIF as one of its own. A subsequent packet for that VIF would result in the network address resolution module in the receiving network agent replying with a unicast NOT-HERE message (525). This causes the network address resolution module in the network agent that sent the packet to delete the stale entry in its NARTs (530) and to relearn the VIF's location using a broadcast WHERE message (535). As appreciated by one of skill in the art, WHERE messages trigger a HERE response with the VIF information, which is then entered in the receiving network agent's NARTs.

Further, it is appreciated that the HERE, WHERE, and NOT-HERE messages impose only negligible overheads. A HERE message consists of the sender location (64 bits) and the VIF ID being advertised (128 bits), and is 320 bits long, including the required header (as described below). Taking into account other physical layer constraints, such as variable padding and inter-frame gap, a HERE message takes up about 416 bytes.

Given the rapid adoption of 10 Gbps Ethernet in virtualized datacenters, and given that a typical server should support several tens of VMs, a well-balanced server is likely to have at least one 10 Gbps network interface card. Using just about 1% of 10 Gbps (i.e., 100 Mbps), each such server can support at least 175,000 HERE messages per second. This means that the network as a whole can support as many as 175,000 VMs migrations or boots every second. It is appreciated that even for networks with a million VMs, and at more reasonable VM migration/boot rates, the bandwidth may be even lower.

It is further appreciated that the overhead for the NARTs 230 is also low. Each NART table entry is 32 bytes. A hash table that can hold a million entries, at a low loading factor of 0.50, takes up no more than 64 MB. To put this in perspective, even the smallest datacenter server has about 8 GB of main memory, and so this table accounts for only about 0.8% of overhead.

A schematic diagram of example NARTs stored by the network address resolution modules in the network agents across the network is illustrated in FIG. 6. A network agent may keep NARTs to identify and locate all VIFs in the network, such as, for example, NARTs 600 and 605. The NART 600 may be used to store addressing information and the NART 605 may be used to store both addressing and location information for all the VIFs in the network.

The NART 600 may identify the VIFs by their tenant IDs and IP addresses in the column 610 and by their MAC address in the column 615. The NART 605 may identify the VIFs by their unique three-tuple <Tenant_ID, MAC_AS_ID, MAC> in the column 620, and store location information in the column 625 for each entry in the column 620 (i.e., the MAC address and the port number of the switch to which the server hosting the VIF is connected).

It is appreciated that in cases where only an L2 network abstraction is supported by the network architecture, the VIFs do not need to have IP addresses. In this case, they communicate based only on their MAC addresses. It is also appreciated that NARTs 600-605 may be implemented as a single table. It is further appreciated that the NARTs 600-605 may be implemented as distributed hash tables with their first column used as the key and their second column used as the value.

Note that the information stored in the NARTs 600-605 is the information carried by a HERE message when the network address resolution module announces the presence of a new VIF in the network. The HERE message contains, for a given VIF, its tenant ID, its MAC address, its MAC_AS_ID, its IP address, and the MAC address and port number of the switch to which the VIF is connected. With this information, packets may be routed throughout the network, as described in more detail herein below with reference to FIGS. 8-12.

Figure 7:
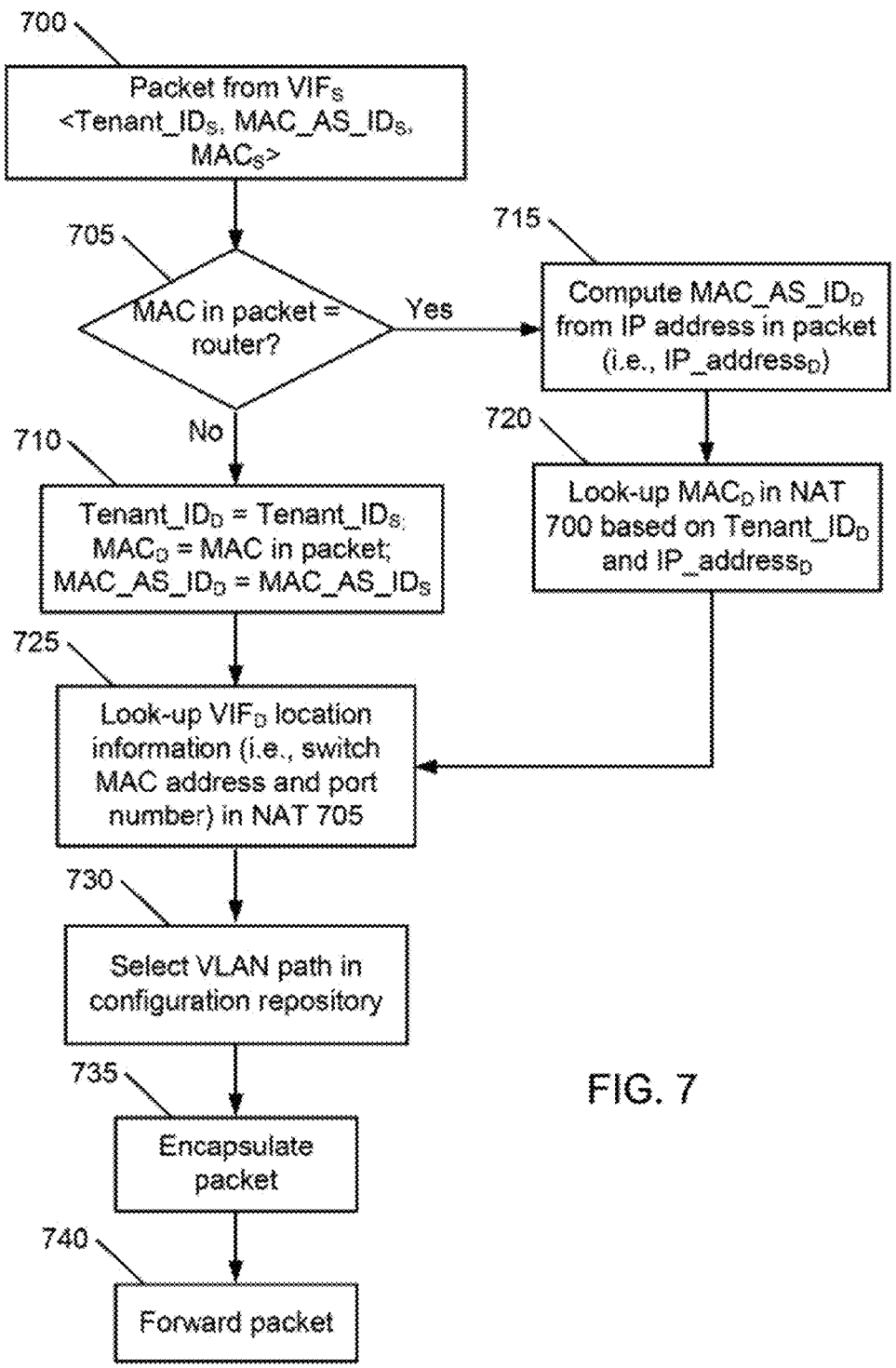
FIG. 7 is a flowchart for a packet forwarding module of FIG. 2 in accordance with various embodiments.

Referring now to FIG. 7, a flowchart for a packet forwarding module of FIG. 2 in accordance with various embodiments is described. Packets are transmitted from VMs and arrive at the network agent (e.g., network agent 200) running in their host server before being forwarded across the network. Each packet has a MAC header with the MAC address of its destination and may or may not have an IP address in an IP header. The MAC address of a destination VIF may be found by an ARP query sent by the source VM and resolved by its network agent, or it may be broadcasted (in an ARP packet).

The goal of the packet forwarding module in the network agent (e.g., packet forwarding module 215 in the network agent 200) is to properly identify and locate the packets' destination and prepare them for forwarding across the network. Packets having addressing information (e.g., HERE, WHERE, NOT-HERE, ARP packets) are handled by the network address resolution module as described above.

First, a packet arrives at the packet forwarding module from a source VM (700). The source VIF ("$VIF_S$") in the source VM as described above with reference to FIG. 7, is uniquely identified by the three-tuple <$Tenant\_ID_S$, $MAC\_AS\_ID_S$, $MAC_S$>. The tenant ID of the destination VIF ("$VIF_D$") is always the same as that of the source VIF, as tenants are isolated from each other in the network and only communicate among their own VMs. To forward packets across the network, the packet forwarding module needs to know the unique three-tuple <$Tenant\_ID_D$, $MAC\_AS\_ID_D$, $MAC_D$> that identifies the destination $VIF_D$ as well as where it is located (i.e., the MAC address and port number of the switch to which the $VIF_D$ is connected).

The first clue as to where the packet is destined is provided by the MAC address in the packet. If the MAC address in the packet is not the MAC address of a router (705), then the packet forwarding module knows that the packet is addressed to a $VIF_D$ in the same MAC address space as the $VIF_S$. That is, the MAC address in the packet is the MAC address of the $VIF_D$ itself. The packet forwarding module therefore knows the unique three-tuple <$Tenant\_ID_D$, $MAC\_AS\_ID_D$, $MAC_D$> that identifies the $VIF_D$, as $Tenant\_ID_D$=$Tenant\_ID_S$, $MAC\_AS\_ID_D$=$MAC\_AS\_ID_S$, and $MAC_D$=MAC address in the packet (710).

Otherwise, if the MAC address in the packet is the MAC address of a router, then the packet is destined to a $VIF_D$ in a subnet different from that of the $VIF_S$. In this case, because the packet is being sent to a router/switch, the packet contains an IP header with the IP address of the $VIF_D$. The packet forwarding module can then determine the IP subnet where the $VIF_D$ is located from the IP address in the packet (715). It can then determine the correct $MAC\_AS\_ID_D$ by any of several means, including directly using the destination IP subnet number, or using a lookup table. The packet forwarding module can determine the $MAC_D$ address by looking it up in the NART 600, based on the $Tenant\_ID_D$ and the IP address in the packet (720).

With the three-tuple of the $VIF_D$ known, the packet forwarding module is left to determine the location of the $VIF_D$ in the network, that is, the server on which this VIF is located and the switch and the port number to which the server is connected. The packet forwarding module simply looks up the location information in NART 705 based on the identified three-tuple (725). Once the packet destination is fully identified and located by the packet forwarding module, a VLAN path is selected by checking the information previously downloaded from the configuration repository 115 (730) (e.g., the information in VLAN table 235). The last step is to encapsulate the packet (735) so the packet can be forwarded to its destination (740).

Figure 8:
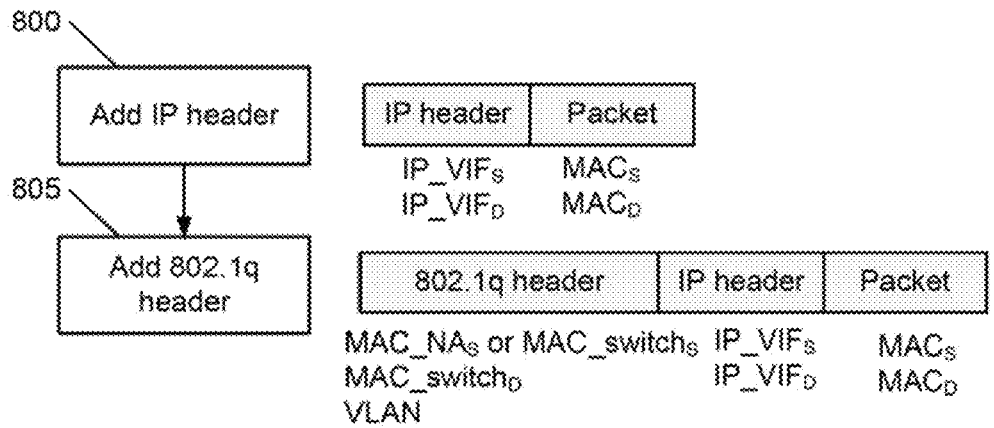
FIG. 8 is a schematic diagram of an example packet encapsulation in accordance with various embodiments.

Attention is now directed to FIG. 8, which illustrates a schematic diagram of an example packet encapsulation in accordance with the various embodiments. The packet encapsulation module 220 adds an IP header (800) and an 802.1q Ethernet header (805) to each packet to be transmitted across the network by the packet forwarding module 215. The IP header contains the special IP addresses associated with the source and destination VIFs. The 802.1q Ethernet header contains the MAC address of the source switch, the MAC address of the destination switch, and a VLAN tag specifying the VLAN path to be taken by the packet across the network. It is appreciated that each packet also needs to carry the MAC_AS_ID of the source VIF so that the destination network agent can disambiguate between two VIFs of the same tenant with the same MAC addresses but belonging to different MAC address spaces. This MAC_AS_ID can be carried in either the source address field of the IP header or some other field of the IP header (e.g., in the IP-ID field, along with the 12-bit VLAN identifier).

The selected VLAN tag is also carried in the datagram ID field of the IP header, because the 802.1q header is discarded at the destination switch (i.e., the egress edge switch) and the receiving network agent may want to be able to determine the VLAN that carried the packet for monitoring and other purposes. As appreciated by one of skill in the art, inserting the VLAN tag in the datagram ID field of the IP header is not problematic because the "don't fragment" bit in the IP header is set, thereby preventing packet fragmentation. It is also appreciated that if the destination VIF is attached to the same switch as the source VIF, then instead of putting the MAC address of the destination switch in the 802.1q header, the packet encapsulation module 220 uses the MAC address of its server (i.e., the source server where the network agent running the packet encapsulation module resides). This is done because switches drop packets that have the same MAC address for the source and destination and the MAC address of the source network agent is not exposed beyond the switch itself. It is further appreciated that this packet encapsulation does not require or result in the servers' MAC addresses to be exposed to the network, nor does it consume any extra FIB entries in the local edge switches.

Figure 9:
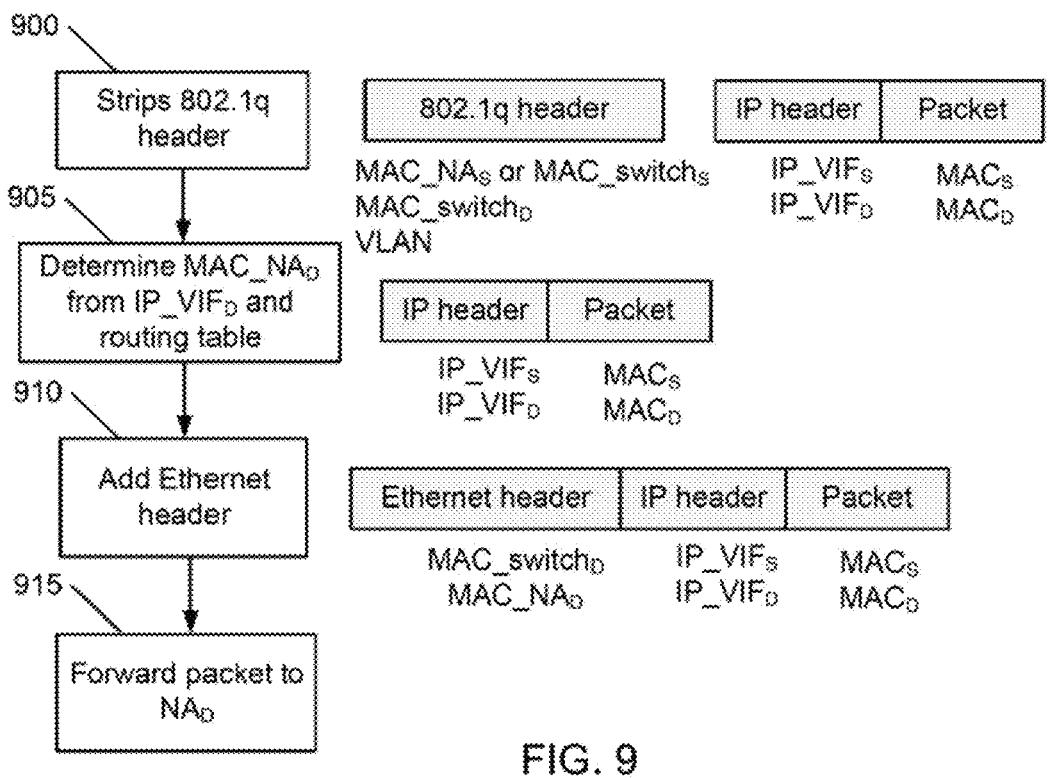
FIG. 9 is a flowchart for a destination switch to prepare a packet for transmission to a destination virtual interface.

After the packet is encapsulated, it is forwarded across the VLAN specified by the VLAN tag in the 802.1q header until it arrives at its destination (i.e., egress) switch. FIG. 9 illustrates the steps taken at the destination switch to prepare the packet for transmission to the destination VIF. Upon receiving the packet, the switch recognizes the destination MAC address in the 802.1q header inserted by the packet encapsulation module 220 as its own and strips the header (900). The switch then looks at the IP address of the destination VIF in its routing table to determine the IP address of the server hosting the destination VIF (905). The switch then inserts an Ethernet header specifying its own MAC as the source MAC address and the MAC of the server hosting the destination VIF as the destination MAC address (910). The packet is then forwarded to the server hosting the destination VIF, where it is received by the packet reception module 225 at the network agent running in the server's hypervisor.

Figure 10:
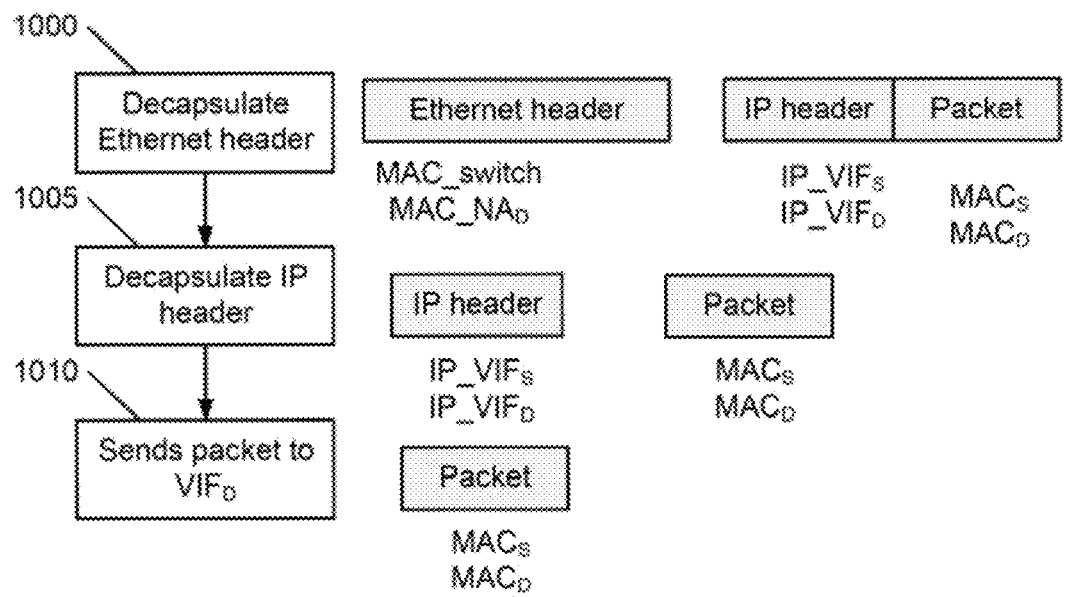
FIG. 10 is a flowchart for a packet reception module of FIG. 2 in accordance with various embodiments.

The steps taken by the packet reception module 225 when receiving the packet are illustrated in FIG. 10. The packet reception module 225 first strips or decapsulates the Ethernet header from the packet (1000) and then strips the IP header from the packet (1005). The packet is then forwarded to the destination VIF based on its MAC address in the packet, the MAC_AS_ID, and the tenant ID) as encoded in the special IP address associated with the destination VIF (1010).

Figure 11:
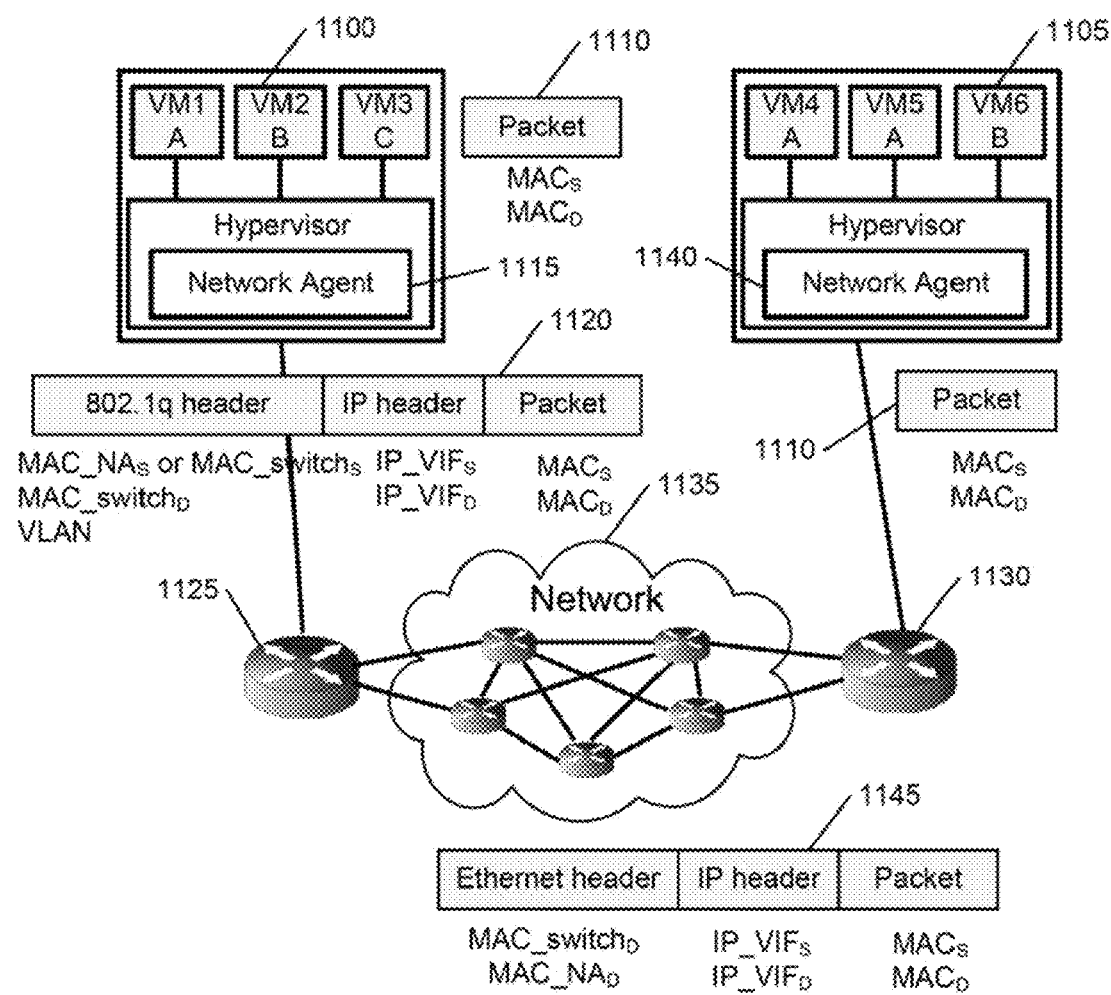
FIG. 11 is a schematic diagram of an example path for a packet transmitted across the network from a source virtual interface to a destination virtual interface.

Attention is now directed to FIG. 11, which illustrates an example packet flow for a packet transmitted across the network from a source VIF to a destination VIF. VM 1100 wants to send a packet to VM 1105. Both VMs belong to the tenant "B", but are in different servers. VM 1100 sends a packet 1110 out as it normally would to VM 1105. The packet 1110 contains the MAC address $MAC_S$ of the source VIF in the VM 1100 and the $MAC_D$ address of the destination VIF in the VM 1105. The VM 1100 may use the address resolution protocol ("ARP") to get the MAC) address of the destination VIF in the VM 1105 from the network agent 1115.

The packet 1110 with the $MAC_S$ and the $MAC_D$ addresses is sent out by the VIF in the VM 1100 to the network agent 1115. There, as described above with reference to FIGS. 7-9, the network agent 1115 determines how to direct the packet 1110 across the network in the packet forwarding module 215 and encapsulates the packet 1110 with an IP header and an 802.1q header to form an encapsulated packet 1120. The IP header of the encapsulated packet 1120 contains the IP addresses of the source and destination VIFs, i.e., $IP\_VIF_S$ and $IP\_VIF_D$, while the 802.1q header contains the MAC addresses of the source and destination switches, that is, the $MAC\_switch_S$ address of the ingress switch 1125 and the $MAC\_switch_D$ address of the egress switch 1130, and a VLAN tag indicating the VLAN path for the encapsulated packet 1120 to take across the network 1135 from the ingress switch 1125 to the egress switch 1130.

The encapsulated packet 1120 takes the VLAN path specified in the VLAN tag and arrives at the egress switch 1130. There, as described above with reference to FIG. 9, the 802.1q header is stripped or decapsulated, and the switch inquires its routing table to determine the MAC address of the server hosting the network agent 1140 (i.e., $MAC\_NA_D$) supporting the VM 1105. The switch 1130 then inserts an Ethernet header with its $MAC\_switch_D$ address as the source MAC address and the $MAC\_NA_D$ as the destination MAC address to form the packet 1145, and forwards the packet 1145 to the network agent 1140. The network agent 1140 then decapsulates the packet 1145 to retrieve the packet 1110, as described above with reference to FIG. 10, and forwards the packet 1110 to the destination VIF in the VM 1105.

It is appreciated that the steps described above for transmitting the packet 1110 from VM 1100 to VM 1105 are shown for illustration purposes only. The steps may be different for packets transmitted between VMs in different IP subnets. It is also appreciated that a public address space may be implemented as a special tenant with a selected ID. e.g., ID 2. This tenant may include some special virtual interfaces that handle the packets bound to destinations external to the network in the datacenter. In this case, the nodes behind these interfaces (could be fully dedicated physical machines) merely relay packets to and from the real physical router interfaces.

Advantageously, the network architecture described herein above allows tenants to have a simple abstract view of their network. Each tenant sees all of its VMs within an IP subnet as connected to a single virtual switch, and all its IP subnets as interconnected with a single router. The switches and the routers themselves present a very simple view; they require no configuration, and can always scale to the necessary number of ports. Furthermore, the network architecture places no restrictions on how the tenants design its network, or on the protocols they run. Tenants can assign IP and MAC addresses as they please and use them for any purpose—not just communication. For example, many enterprise applications use hard-coded MAC and IP addresses, and sometimes even for authentication purposes. Although the network architecture provides built-in support for IPv4, the tenants are free to use an L2-only abstraction, and can run other transport protocols such as IPv6.

The network architecture may therefore facilitate development of novel network and transport protocols.

In various embodiments, the network architecture can support as many as 65533 tenants simultaneously for the 10.p.0.0/16 addressing scheme, and may be scaled to support more. This limit arises because of the number of bits (e.g., 16) used in the IP address to designate a tenant ID. This number of bits can be extended by, for example, shifting a bit within the IP address from the port ID field to the tenant ID field, or using another addressing scheme such as p.0.0.0/24 (in which case 24 bits would be used for the tenant ID). Doing so may significantly increase the number of tenants supported (to at least 128K). Alternatively, a UDP header may be included in the packet encapsulation performed by the packet encapsulation module in the network agent (e.g., the packet encapsulation module 220 in the network agent 200) so that the UDP port number fields may be used to extend the tenant ID space. As appreciated by one of skill in the art, proprietary headers are avoided because they make it hard for the network to identify packets belonging to a particular tenant.

It is further appreciated that the network architecture allows at least an order of magnitude more VMs than traditional networks, because its packet encapsulation allows efficient use of one of the most critical switch resources: the space required to store a Forwarding Information Base ("FIB") table. The network architecture does this by ensuring that the outer 802.1q/Ethernet header carries only the addresses of the network switches. That is, all packets appear to the network as if they are being exchanged between the edge switches. This means that the non-edge switches need only learn and store FIB table entries for a few hundred other edge switches, while the edge switches need also have FIB entries for their locally attached servers. The switches therefore are insulated from the much larger number of VM addresses.

The network architecture thus enables useful scalability while providing clients with a simple network abstraction and operation. As appreciated by one of skill in the art, the network architecture simplifies network operation in three different ways. First, as described above with reference to FIGS. 3-4 for the configuration module 205, the network architecture automates all of its configuration. The configuration details are either computed offline (e.g., the VLAN configuration stored in the configuration repository 115) or are autonomously determined by individual entities (e.g., the IP routing tables in the edge switches). Also, most of the configuration is static; this not only eliminates the need for constant supervision by humans, but also makes debugging and trouble-shooting easier.

Second, the network architecture makes it easy to exploit QoS mechanisms that are standard on many commodity switches, implement tenant-specific traffic engineering, Access Control Lists ("ACLs"), and isolation policies within the network. As a design principle, the network architecture makes use of only standard header formats: this makes all important tenant information available in header fields that are supported by even the most basic ACL mechanisms. For example, an ACL can match all packets belonging to a single tenant simply by using the low-order bits of the IP address (the tenant ID). Or, to improve scaling, an ACL could match against just a prefix or a subset of these low-order bits, to allow the tenant ID to encode a class of service, as assigned by the service provider. Similarly, a tenant's flow between two physical servers can be easily identified by matching on the source and destination MAC addresses, and on the port number bytes of the encapsulation header IP addresses. The network architecture's use of the Ethernet with programmability at the network agents at the server makes it easier to deploy sophisticated QoS via a central controller.

Finally, the network architecture addresses both components of the total cost of operation: capital and operational costs. It minimizes capital expenses, because it can efficiently utilize inexpensive, feature- and resource-limited commodity switches. The network architecture also eliminates wasted up-front capital costs, because of its ability to make the best use of any topology. This allows the operator to grow the network as needed, and only in small increments, unlike architectures that require a fixed topology such as Fat Tree networks (Fat Trees can only be grown in large increments).

As appreciated by one of skill in the art, operational expenses in datacenter networks are dominated by the cost of human operators. The network architecture described herein above requires very little operator attention, as most of its configuration is automatic and static. Also, because the network architecture allows VM placement without worrying about network issues, it can reduce the complexity of that aspect of datacenter management.

Figure 12:
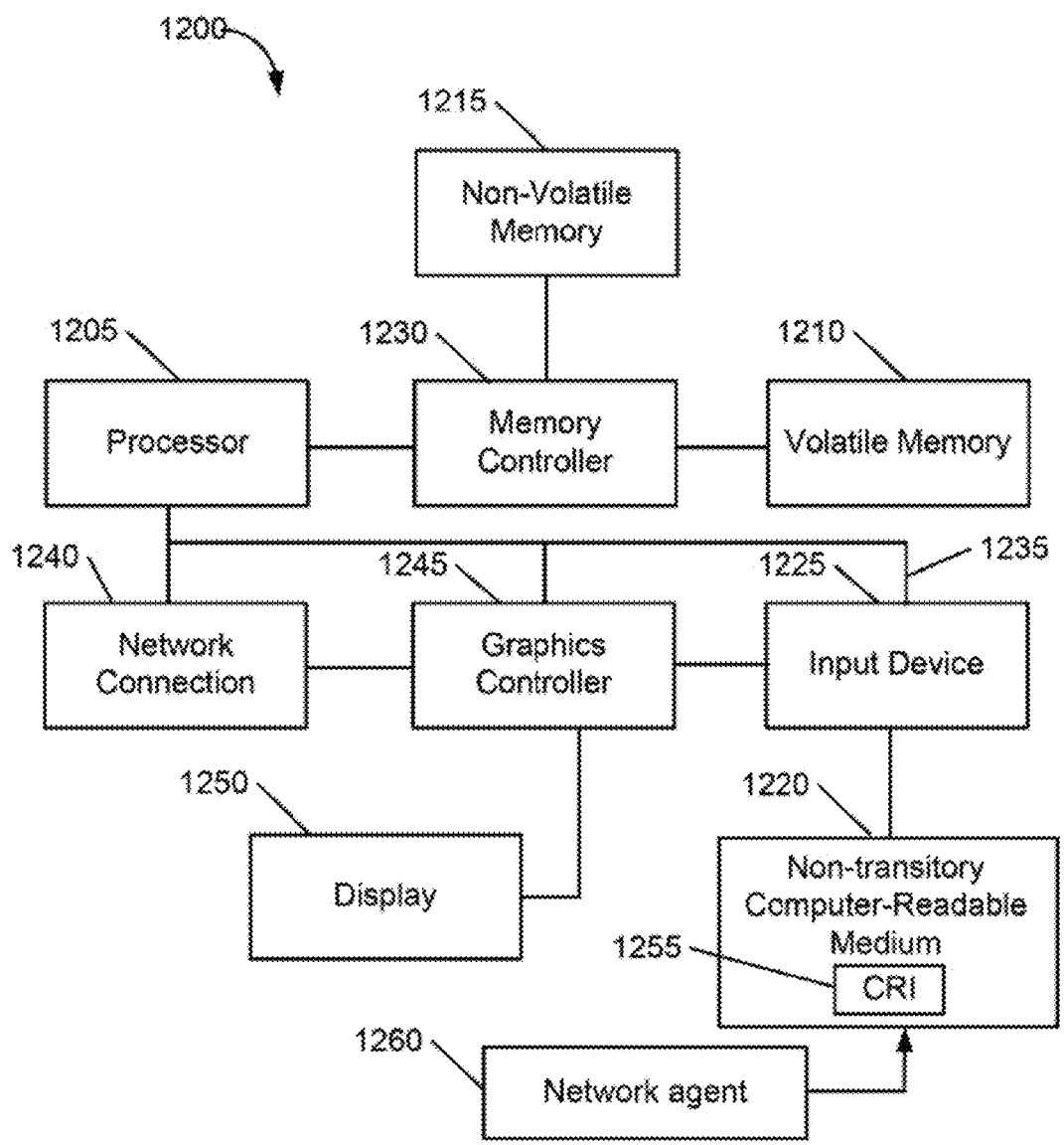
FIG. 12 is a block diagram of an example of a server for hosting a network agent according to the present disclosure.

Referring now to FIG. 12, a block diagram of an example of a server for hosting a network agent according to the present disclosure is described. The server 1200 (e.g., a desktop computer, a laptop, or a mobile device) can include a processor 1205 and memory resources, such as, for example, the volatile memory 1210 and/or the non-volatile memory 1215, for executing instructions stored in a tangible non-transitory medium (e.g., volatile memory 1210, non-volatile memory 1215, and/or computer readable medium 1220) and/or an application specific integrated circuit ("ASIC") including logic configured to perform various examples of the present disclosure.

A machine (e.g., a computing device) can include and/or receive a tangible non-transitory computer-readable medium 1220 storing a set of computer-readable instructions (e.g., software) via an input device 1225. As used herein, the processor 1205 can include one or a plurality of processors such as in a parallel processing system. The memory can include memory addressable by the processor 1205 for execution of computer readable instructions. The computer readable medium 1220 can include volatile and/or non-volatile memory such as a random access memory ("RAM"), magnetic memory such as a hard disk, floppy disk, and/or tape memory, a solid state drive ("SSD"), flash memory, phase change memory, and so on. In some embodiments, the non-volatile memory 1215 can be a local or remote database including a plurality of physical non-volatile memory devices.

The processor 1205 can control the overall operation of the server 1200. The processor 1205 can be connected to a memory controller 1230, which can read and/or write data from and/or to volatile memory 1210 (e.g., RAM). The memory controller 1230 can include an ASIC and/or a processor with its own memory resources (e.g., volatile and/or non-volatile memory). The volatile memory 1210 can include one or a plurality of memory modules (e.g., chips).

The processor 1205 can be connected to a bus 1235 to provide communication between the processor 1205, the network connection 1240, and other portions of the server 1200. The non-volatile memory 1215 can provide persistent data storage for the server 1200. Further, the graphics controller 1245 can connect to a display 1250.

Each server 1200 can include a computing device including control circuitry such as a processor, a state machine, ASIC, controller, and/or similar machine. Each server 1200 can also include one or more VMs (not shown), and have a hypervisor to manage the VMs. As used herein, the indefinite articles "a" and/or "an" can indicate one or more than one of the named object. Thus, for example, "a processor" can include one processor or more than one processor, such as a parallel processing arrangement.

The control circuitry can have a structure that provides a given functionality, and/or execute computer-readable instructions that are stored on a non-transitory computer-readable medium (e.g., the non-transitory computer-readable medium 1220). The non-transitory computer-readable medium 1220 can be integral, or communicatively coupled, to a computing device, in either a wired or wireless manner. For example, the non-transitory computer-readable medium 1220 can be an internal memory, a portable memory, a portable disk, or a memory located internal to another computing resource (e.g., enabling the computer-readable instructions to be downloaded over the Internet).

The non-transitory computer-readable medium 1220 can have computer-readable instructions 1255 stored thereon that are executed by the control circuitry (e.g., processor) to implement a network agent according to the present disclosure. For example, the non-transitory computer medium 1220 can have computer-readable instructions 1255 for implementing a network agent 1260.

The non-transitory computer-readable medium 1220, as used herein, can include volatile and/or non-volatile memory. Volatile memory can include memory that depends upon power to store information, such as various types of dynamic random access memory ("DRAM"), among others. Non-volatile memory can include memory that does not depend upon power to store information. Examples of non-volatile memory can include solid state media such as flash memory, EEPROM, and phase change random access memory ("PCRAM"), among others. The non-transitory computer-readable medium 1220 can include optical discs, digital video discs ("DVD"), Blu-Ray Discs, compact discs ("CD"), laser discs, and magnetic media such as tape drives, floppy discs, and hard drives, solid state media such as flash memory, EEPROM, PCRAM, as well as any other type of computer-readable media.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. For example, it is appreciated that the present disclosure is not limited to a particular computing system configuration, such as server 1200.

Those of skill in the art would further appreciate that the various illustrative modules and steps described in connection with the embodiments disclosed herein may be implemented as electronic hardware, computer software, or combinations of both. For example, the network agent 200 may be implemented using software modules, hardware modules or components, or a combination of software and hardware modules or components. Thus, in one embodiment, one or more of the modules of FIG. 2 may comprise hardware modules or components. In another embodiment, one or more of the modules of FIG. 2 may comprise software code stored on a computer readable storage medium, which is executable by a processor.

To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

What is claimed is:

1. A server comprising:
    at least one processor; and
    a network agent executable on the at least one processor to:
        encapsulate a packet for transmission across a network from a source virtual interface to a destination virtual interface for a tenant, the source virtual interface and the destination virtual interface being part of a plurality of virtual interfaces hosted by respective servers, the packet encapsulated with information identifying and locating the destination virtual interface, the information to be interpreted by switches connected to the source virtual interface and the destination virtual interface, and
        associate a given virtual interface in the server with an Internet Protocol (IP) address based on a tenant identifier for a tenant associated with the given virtual interface and an identifier of a port of a switch to which the server is connected.

2. The server of claim 1, wherein the plurality of virtual interfaces are in a plurality of virtual machines hosted by the respective servers.

3. The server of claim 1, wherein the network agent is executable on the at least one processor to:
    assign an IP address to the server based on the identifier of the port of the switch to which the server is connected.

4. The server of claim 3, wherein the identifier of the port is a port number of the port of the switch.

5. The server of claim 1, wherein the network agent comprises a network address resolution module to gather and store information used for transmitting packets across the network in one or more network address tables.

6. The server of claim 5, wherein the one or more network address tables comprise:
    a first network address table storing a tenant identifier, an IP address and a Media Access Control (MAC) address for each virtual interface; and
    a second network address table uniquely identifying each virtual interface by a tenant identifier, a MAC address space identifier associated with the each virtual interface, and a MAC address for each virtual interface, and locating each virtual interface in the network with a MAC address and a port number of a switch connected to the each virtual interface.

7. The server of claim 6, wherein the network agent comprises a packet forwarding module to:
    identify the destination virtual interface with a tenant identifier, a destination MAC address space identifier, and a destination MAC address;
    look-up network location information for the destination virtual interface in the second network address table;
    select a virtual local area network (VLAN) path for forwarding a packet to the destination virtual interface; and
    forward the packet to the destination virtual interface after encapsulating the packet.

8. The server of claim 7, wherein the network agent comprises a packet encapsulation module to encapsulate the packet with an IP header containing an IP address for the destination virtual interface and with an Ethernet header containing a MAC address for a source switch connected to the source virtual interface, a MAC address for a destination switch connected to the destination virtual interface, and a VLAN tag specifying a VLAN path between the source switch and the destination switch.

9. The server of claim 8, wherein the forwarding of the packet causes the destination switch to decapsulate the Ethernet header and insert a header specifying the MAC address for the destination switch as a source MAC address and a MAC address for a server hosting the destination virtual interface as a destination MAC address.

10. The server of claim 1, wherein the tenant is associated with a MAC address space.

11. A method for use in a scalable, multi-tenant network in a virtualized datacenter, the method comprising:
    executing, in a server, a network agent, and hosting a plurality of virtual interfaces in the server, each virtual interface associated with a tenant of a plurality of tenants;
    broadcasting, by a network address resolution module of the network agent executed in the server, a message to network agents in the network in response to a given virtual interface being started in the server, wherein the message comprises information that uniquely identifies and locates the given virtual interface in the network, the information comprising a tenant identifier for a tenant associated with the given virtual interface, a Media Access Control (MAC) address space identifier associated with the given virtual interface, and a MAC address for the given virtual interface; and
    encapsulating, by a packet encapsulation module of the network agent executed in the server, a packet, prior to transmission of the packet, with information that uniquely identifies and locates a destination virtual interface in the network based on a tenant associated with the destination virtual interface and a switch connected to the destination virtual interface.

12. The method of claim 11, further comprising:
    assigning an Internet Protocol (IP) address to the server based on a port number of a switch connected to the server; and
    associating the given interface with an IP address based on the tenant identifier for the tenant associated with the given virtual interface and the port number of the switch connected to the server.

13. The method of claim 11, wherein the information included in the message further comprises a port number and a MAC address for a switch connected to the given virtual interface.

14. The method of claim 11, further comprising storing, by the network address resolution module:
    a first network address table storing a tenant identifier, an Internet Protocol (IP) address, and a MAC address for each virtual interface of virtual interfaces in the network; and
    a second network address table uniquely identifying each virtual interface of the virtual interfaces in the network by a tenant identifier, a MAC address space identifier associated with each virtual interface, and the MAC address for each virtual interface, and locating each virtual interface of the virtual interfaces in the network with a MAC address and a port number of a switch connected to each virtual interface.

15. The method of claim 11, wherein the encapsulating comprises encapsulating the packet with an Internet Protocol (IP) header containing an IP address for the destination virtual interface, and with an Ethernet header containing a MAC address for a source switch connected to a source virtual interface, a MAC address for a destination switch connected to the destination virtual interface, and a virtual local area network (VLAN) tag specifying a VLAN path between the source switch and the destination switch.

16. A non-transitory, computer-readable storage medium comprising executable instructions to:
   identify a source virtual interface in a scalable, multi-tenant network in a virtualized datacenter with a tenant identifier, a source Media Access Control (MAC) address space identifier, and a source MAC address;
   identify a destination virtual interface in the network with the tenant identifier, a destination MAC address space identifier, and a destination MAC address;
   look-up network location information for the destination virtual interface in a network address table; and
   encapsulate a packet for transmission across the network with information identifying and locating the destination virtual interface, the information identifying and locating the destination virtual interface to be interpreted by edge switches connected to the source virtual interface and the destination virtual interface in the network.

17. The non-transitory, computer-readable storage medium of claim 16, wherein the network address table is stored in a plurality of servers in the network.

* * * * *